United States Patent [19]

Shibata et al.

[11] Patent Number: 5,142,601
[45] Date of Patent: Aug. 25, 1992

[54] OPTICAL CONNECTOR AND A METHOD FOR ASSEMBLING THE SAME

[75] Inventors: Nobuyuki Shibata; Kenji Suzuki; Ren-ichi Yuguchi, all of Tokyo, Japan

[73] Assignee: The Furukawa Electric Co., Ltd., Tokyo, Japan

[21] Appl. No.: 717,335

[22] Filed: Jun. 18, 1991

[30] Foreign Application Priority Data

Jun. 21, 1990 [JP] Japan .................................. 2-163447
Jun. 26, 1990 [JP] Japan .................................. 2-67629[U]

[51] Int. Cl.$^5$ ............................................... G02B 6/32
[52] U.S. Cl. ........................................ 385/86; 385/60; 385/78
[58] Field of Search ............... 350/96.20, 96.21, 96.22, 350/96.23; 385/86, 76, 60, 78

[56] References Cited

U.S. PATENT DOCUMENTS

| | | | |
|---|---|---|---|
| 4,737,010 | 4/1988 | Le Maitre et al. | 350/96.20 |
| 4,795,229 | 1/1989 | Abendschein et al. | 350/96.20 |
| 4,804,244 | 2/1989 | Hasegawa et al. | 350/96.20 |
| 4,843,487 | 5/1989 | Abendschein et al. | 350/96.20 |
| 4,887,875 | 12/1989 | Chang et al. | 350/96.20 X |
| 5,000,537 | 3/1991 | Saito et al. | 350/96.20 |

Primary Examiner—Frank Gonzalez
Assistant Examiner—Phan T. Heartney
Attorney, Agent, or Firm—Frishauf, Holtz, Goodman & Woodward

[57] ABSTRACT

An optical connector comprises an optical fiber cable including a nylon-coated fiber, a tension member thereon, a sheath covering the nylon-coated fiber and the tension member, a ferrule provided at the distal end of the optical fiber cable so as to be attached to the distal end of the nylon-coated fiber, and a holder having a distal end restricted in position by the ferrule when mounted on the nylon-coated fiber. The optical connector is constructed so that the holder is mounted on the nylon-coated fiber by after-attachment. A method for assembling the optical connector comprises providing an urging spring fitted on the nylon-coated fiber so as to be interposed between the ferrule and the holder so as to urge the ferrule forward, and providing a gripper attached to the rear portion of the holder. In this method, the holder is formed of a split body such that the holder is mounted on the nylon-coated fiber by after-attachment after the ferrule is mounted on the distal end of the fiber and the spring is then fitted on the rear portion of the ferrule.

6 Claims, 10 Drawing Sheets

OPTICAL CONNECTOR AND A METHOD FOR ASSEMBLING THE SAME

BACKGROUND OF THE INVENTION

The present invention relates to an optical connector for optically connecting single-core optical fibers and a method for assembling the same.

CROSS-REFERENCE TO RELATED APPLICATIONS

Figure 16:
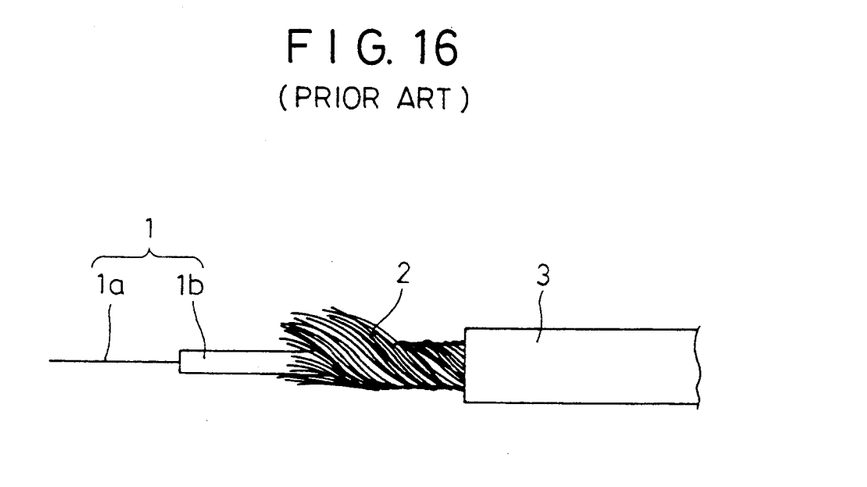
FIG. 16 is a front view of an optical fiber cable used in a conventional optical connector.

As shown in FIG. 16, an optical fiber cable includes a nylon-coated fiber 1 formed of an optical fiber 1a and a coating 1b of nylon or the like thereon, a tension member 2 formed of aramid fibers or the like arranged around the fiber 1, and a sheath 3 of polyvinyl chloride (PVC) or the like covering the fiber 1 and the tension member 2. An optical connector for optically connecting the nylon-coated fibers 1 is attached to an end of each fiber 1.

Figure 17:
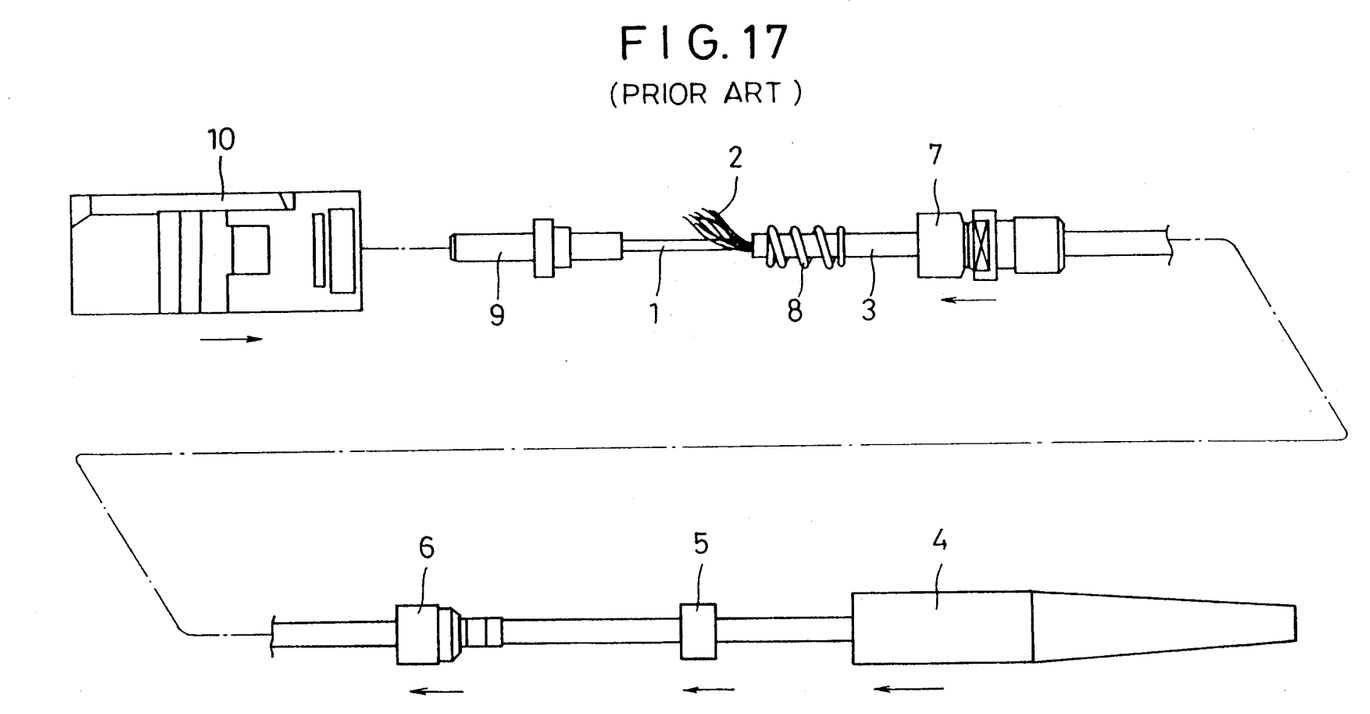
FIG. 17 is an exploded front view of the conventional optical connector.

This optical connector is assembled by putting a plurality of components together. In doing this, a rubber boot 4, ring 5, gripper 6, holder 7, and urging spring 8 are previously fitted onto the optical fiber cable in the order named, as shown in FIG. 17.

Subsequently, the sheath 3 at the distal end portion of the optical fiber cable is removed, and a ferrule 9 is attached to the exposed distal end of the nylon-coated fiber 1. Then, the components 4 to 8 are successively moved forward or toward the ferrule 9 and fixed to one another. Thereafter, a plug frame 10 is fitted on these components, whereupon the optical connector is assembled. Conventionally, this assembling work is a manual one.

Figure 18:
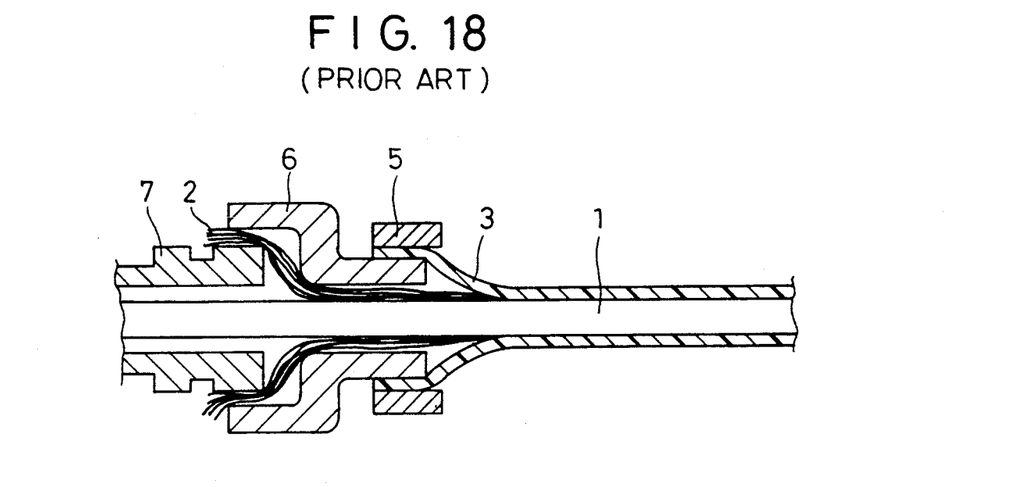
FIG. 18 is a front sectional view showing a state in which a tension member and a sheath are held by means of a holder and a gripper.

In assembling the optical connector in this manner, the gripper 6 is gripped so that the tension member 2 is held between the gripper 6 and the holder 7, and at the same time, the distal end of the sheath 3 is held between the ring 5 and the gripper 6, as shown in FIG. 18. By doing this, the tensile strength of the connector mounting portion of the optical fiber cable is ensured.

Figure 19:
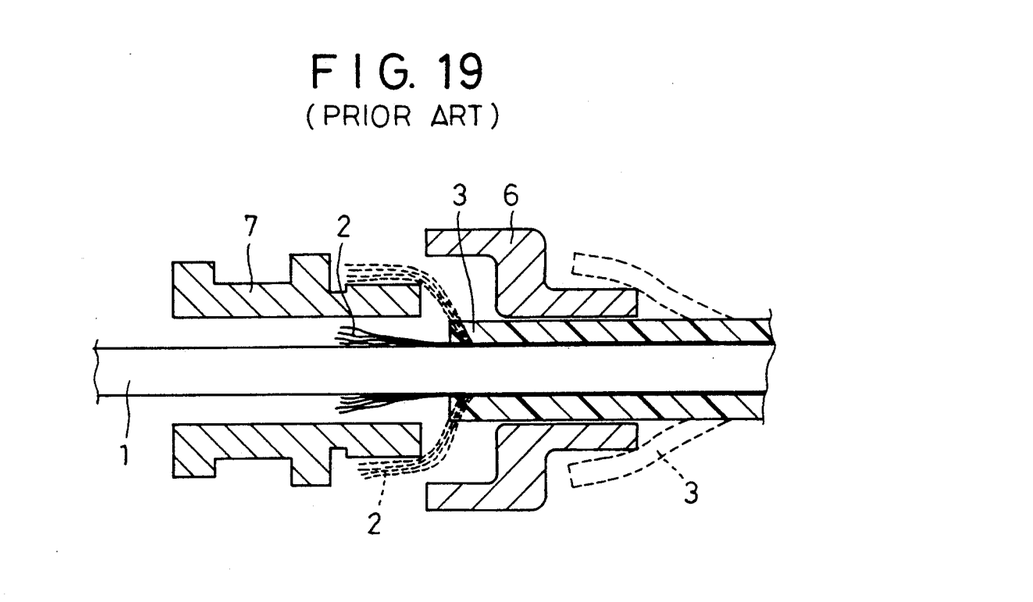
FIG. 19 is a front sectional view showing a state in which the tension member and the sheath are caught in the holder and the gripper, respectively.

If the gripper 6 and the holder 7 are moved forward during the aforesaid assembly of the optical connector, however, the tension member 2 and the sheath 3 will be caught between the nylon-coated fiber 1 and the holder 7 and between the fiber 1 and the gripper 6, respectively, as shown in FIG. 19.

In assembling the optical connector, therefore, the tension member 2 and the sheath 3 should be drawn out of the holder 7 and the gripper 6, respectively, before the gripper 6 is gripped.

Since the sheath 3 has a wall thickness greater than that of the tension member 2, however, it cannot be easily drawn out of the gripper 6, and requires a very complicated drawing operation. Thus, the assembling work for the optical connector is troublesome, so that the productivity is low.

BRIEF SUMMARY OF THE INVENTION

The present invention has been contrived in consideration of these circumstances, and its object is to provide an optical connector capable of being assembled quickly and easily.

In order to achieve the above object, an optical connector according to the present invention comprises an optical fiber cable including a nylon-coated fiber, a tension member thereon, and a sheath covering the nylon-coated fiber and the tension member, a ferrule provided at the distal end of the optical fiber cable so as to be attached to the distal end of the nylon-coated fiber, and a holder having a distal end restricted in position by the ferrule when mounted on the nylon-coated fiber, the holder being mounted on the nylon-coated fiber by after-attachment.

Preferably, the holder is formed with a slit for after-attachment extending parallel to the axis of the nylon-coated fiber.

Preferably, moreover, the optical connector further comprises a gripper attached to the rear portion of the holder, the holder and the gripper being each formed of a split body mounted by after-attachment.

Preferably, furthermore, the optical connector further comprises an urging spring fitted on the nylon-coated fiber so as to be interposed between the ferrule and the holder and adapted to urge the ferrule forward, the urging spring being formed of a shape memory alloy wire and fitted on the nylon-coated fiber by after-attachment.

A method for assembling an optical connector according to the present invention comprises optical fiber cable including a nylon-coated fiber, a providing an urging spring fitted on the nylon-coated fiber so as to be interposed between the ferrule and the holder and adapted to urge the ferrule forward, and providing a gripper attached to the rear portion of the holder. The holder is formed of a split body such that the holder is mounted on the nylon-coated fiber by after-attachment after the ferrule is mounted on the distal end of the fiber and the spring is then fitted on the rear portion of the ferrule.

Preferably, the gripper is formed of a split body such that the gripper is mounted on the rear portion of the holder by after-attachment, whereby the distal end of the tension member is held between the gripper and the holder.

DETAILED DESCRIPTION

Preferred embodiments of the present invention will now be described with reference to the accompanying drawings. In the description of the individual embodiments to follow, like or same components as are used in the conventional optical connector mentioned hereinabove are designated by like reference numerals for simplicity.

A first embodiment of the present invention will now be described in detail with reference to the drawing of FIGS. 1 to 7.

Figure 1:
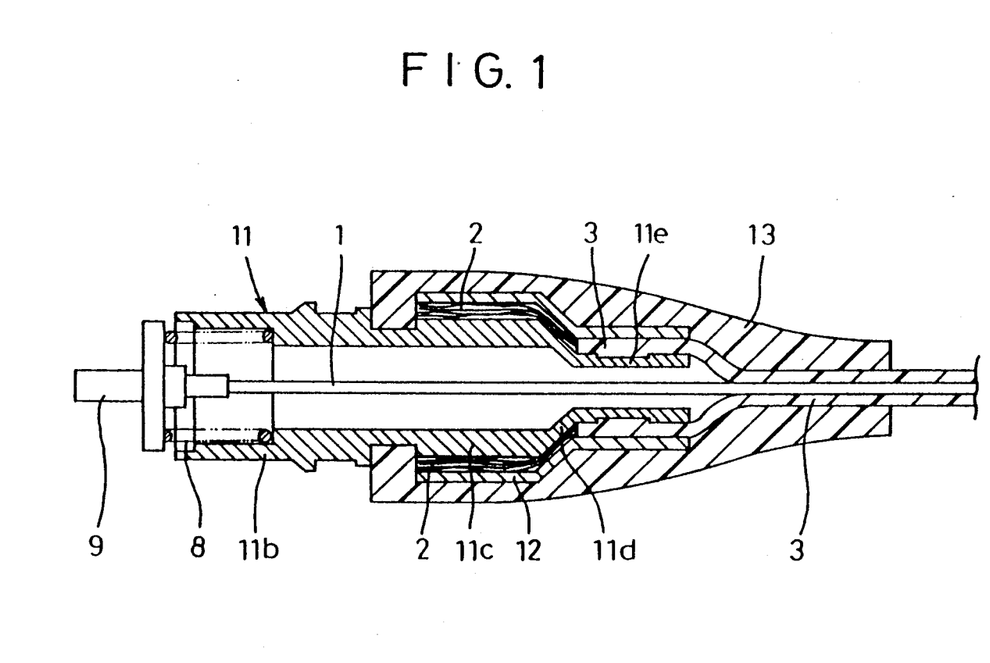
FIG. 1 is a front sectional view of an optical connector according to a first embodiment of the present invention.

As shown in FIG. 1, an optical connector according to the first embodiment comprises a nylon-coated fiber 1 and a ferrule 9 attached to the distal end thereof. A holder 11 is mounted so that a spring 8 is interposed between the holder 11 and the ferrule 9.

Figure 2:
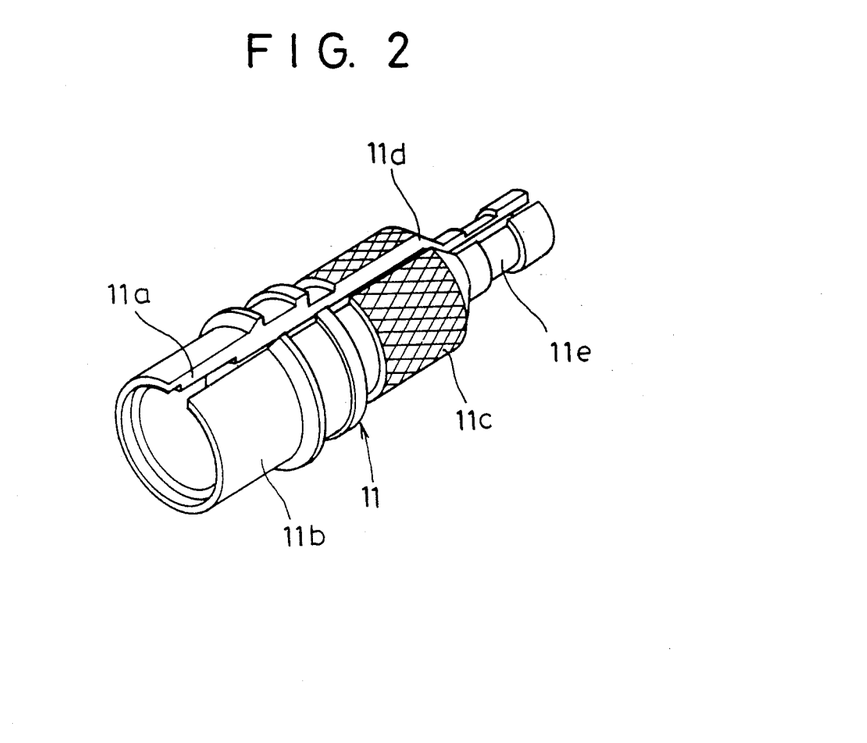
FIG. 2 is a perspective view of a holder used in the optical connector of FIG. 1.

The holder 11, whose distal end position is restricted by the ferrule 9, is a cylindrical metal member having a longitudinal slit 11a, as shown in FIG. 2. The holder 11 includes a large-diameter portion 11b on the front or ferrule side, a knurled nipping portion 11c having a crosshatch pattern on its surface, a tapered slope portion 11d, and a small-diameter portion 11e whose inside diameter is a little greater than the diameter of an optical fiber cable. The slit 11a has a width such that the nylon-coated fiber 1 can be passed through it.

A gripper 12 is fitted on the holder 11 so as to cover the nipping portion 11c and the small-diameter portion 11e at the rear portion of the holder 11. Thus, a tension member 2 of the optical fiber cable and the distal end of a sheath 3 are held between the two members 11 and 12.

A rubber boot 13 is fitted on the rear portion of the holder 11 so as to cover the gripper 12 and the optical fiber cable extending therefrom, thereby protecting the rear side of the optical connector.

A plug frame (not shown) is fitted on the front portion of the holder 11 which is covered by the rubber boot 13.

The following is a description of a method for assembling the optical connector constructed in this manner.

Figure 3:
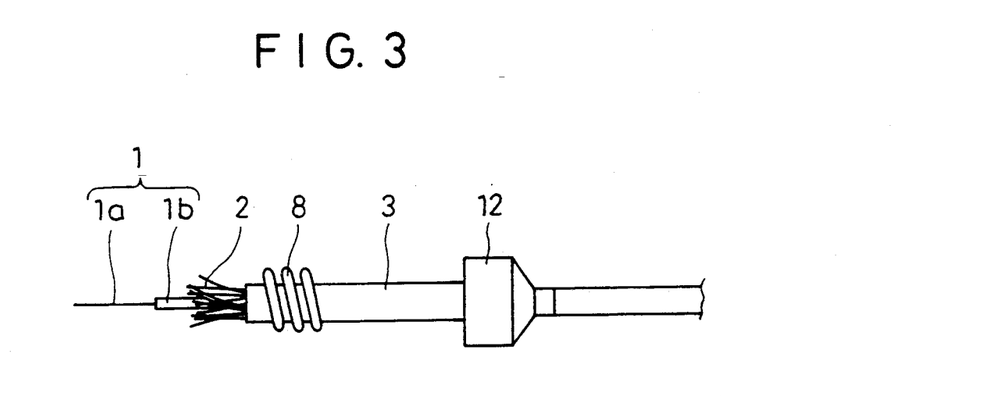
FIG. 3 is a front view for illustrating a method for assembling the optical connector shown in FIG. 1, in which a gripper and a spring are fitted on an optical fiber cable whose nylon-coated fiber is exposed.

First, the rubber boot (not shown), the gripper 12, and the spring 8 are previously fitted on the optical fiber cable, and a predetermined length of the sheath 3 at the distal end of the cable is removed to expose the distal end of the nylon-coated fiber 1 in advance, as shown in FIG. 3.

Figure 4:
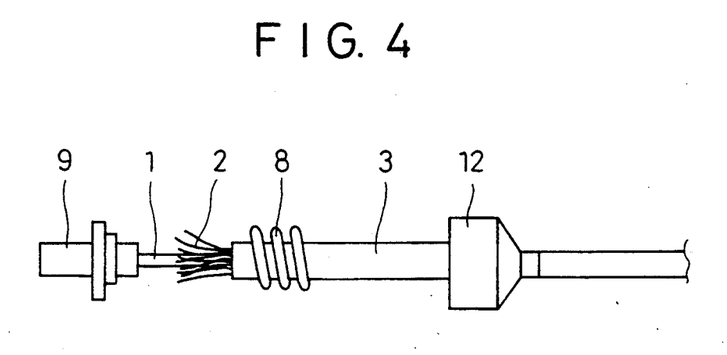
FIG. 4 is a front view showing a ferrule attached to the nylon-coated fiber of the optical fiber cable.

Then, the ferrule 9 is attached to the distal end of the exposed nylon-coated fiber 1, as shown in FIG. 4.

Figure 5:
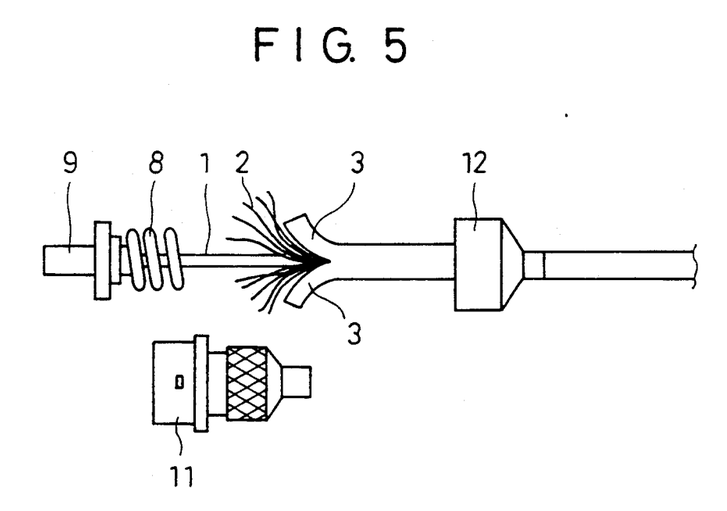
FIG. 5 is a front view showing the way the holder is mounted on the optical fiber cable.

Subsequently, the spring 8 on the optical fiber cable is moved to the side of the ferrule 9, the sheath 3 at the distal end of the cable is cut into two branches, and the tension member 2 and the sheath 3 are moved rearward.

Figure 6:
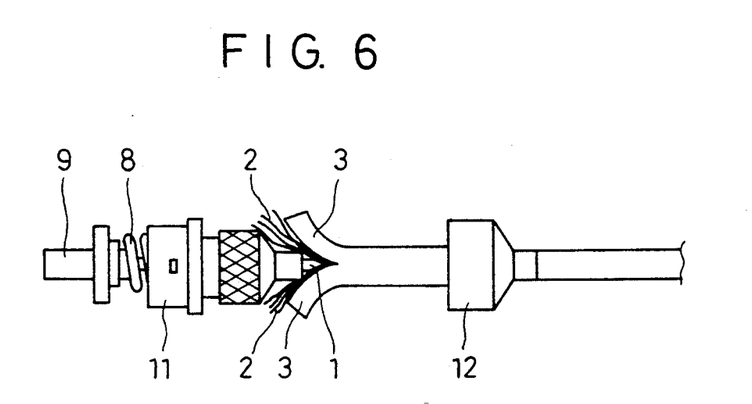
FIG. 6 is a front view showing a state in which the holder of FIG. 5 is mounted in position.

Thereafter, the nylon-coated fiber 1 is passed through the slit 11a, and the holder 11 is mounted on the fiber 1, as shown in FIG. 6.

Figure 7:
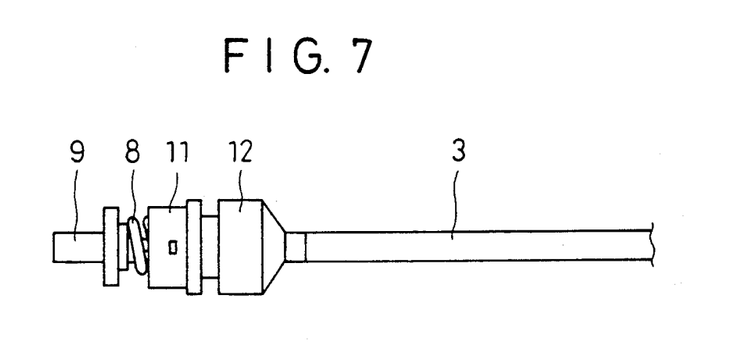
FIG. 7 is a front view showing a state in which the gripper is fitted on the holder.

Then, the gripper 12 previously mounted on the optical fiber cable is moved toward the ferrule 9, and is fitted onto the rear portion of the holder 11, as shown in FIG. 7.

Then, the gripper 12 is gripped so that the tension member 2 and the distal end of the sheath 3 are held between the nipping portion 11c and the small-diameter portion 12e of the holder 11 and the gripper 12.

Since the nipping portion 11c of the holder 11 is knurled and has a crosshatch pattern on its surface, it enjoys increased friction with the tension member 2, so that the gripper 12 can hold the member 2 with a great nipping force.

Thereafter, the rubber boot is moved toward the ferrule 9 to cover the rear portion of the holder 11 on the gripper 12, and the plug frame (not shown) is fitted onto the front portion of the holder 11, whereupon assembling the optical connector is completed.

In the optical connector assembled in this manner, the holder is formed with the slit, so that it can be mounted on the nylon-coated fiber by after-attachment without catching the tension member or the sheath therein. Thus, the optical connector can be mechanically assembled with ease in an automatic line, so that productivity can be improved.

Although the holder is made of metal in the embodiment described above, it may alternatively be formed of synthetic resin. When using a plastic holder, the tension member 2 and the sheath 3 are fixed between the holder and the gripper by means of an adhesive agent. In this case, moreover, the gripper may be formed with a slit, so that the assembling efficiency for the optical connector can be further improved.

A second embodiment of the present invention will now be described in detail with reference to the drawings of FIGS. 8 to 15.

Figure 8:
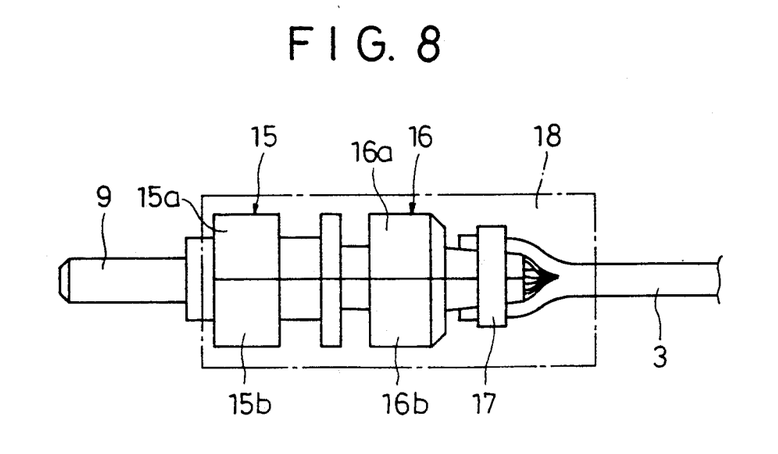
FIG. 8 is a front view of an optical connector according to a second embodiment of the present invention.

In an optical connector according to the present embodiment, as shown in FIG. 8, a holder 15 formed of half pieces 15a and 15b is mounted on the rear portion of a ferrule 9, which is attached to the distal end of a nylon-coated fiber, so that an urging spring (not shown) is interposed between the holder 15 and the ferrule 9. A gripper 16 formed of half pieces 16a and 16b is mounted on the rear portion of the holder 15 so that a tension member (not shown) is held between them.

The half pieces 15a and 15b or 16a and 16b are divisions obtained by halving the holder 15 or the gripper 16 along a plane which passes through the axis of the members 15 or 16.

In the optical connector, moreover, a sheath 3 is nipped by means of a C-ring 17 which is mounted on the rear portion of the gripper 16, and the ring 17 and the nipped portion of the sheath 3 are covered by means of a heat-shrinkable tube 18.

The optical connector constructed in this manner is assembled by the following method.

Figure 9:
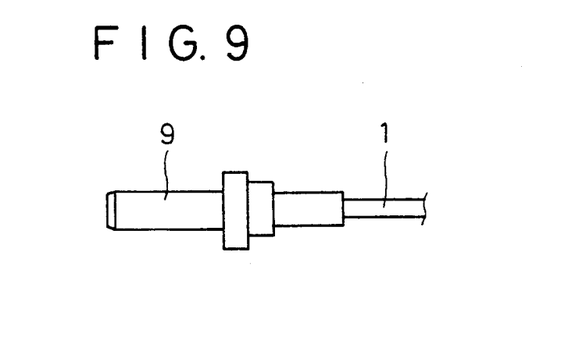
FIG. 9 is a front view for illustrating a method for assembling the optical connector shown in FIG. 8, in which a ferrule is attached to the distal end of a nylon-coated fiber.

First, in a first process, a predetermined length of the sheath 3 at the distal end of the optical fiber cable is removed to expose the nylon-coated fiber 1 and the tension member 2, the ferrule 9 is fixed to the distal end of the fiber 1, as shown in FIG. 9.

Figure 10:
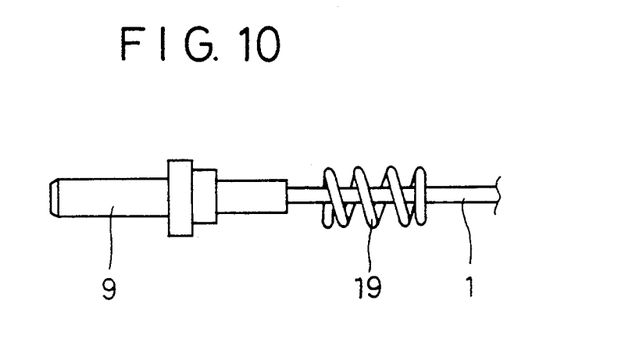
FIG. 10 is a front view showing a state in which an urging spring is fitted on that portion of the nylon-coated fiber near the ferrule of FIG. 9.

Then, in a second process, the urging spring 19 is fitted on that portion of the nylon-coated fiber 1 near the ferrule 9, as shown in FIG. 10. The spring 19 is formed of a Ti-Ni-based shape memory alloy wire, which is previously stored with the shape of the spring 19.

Figure 11:
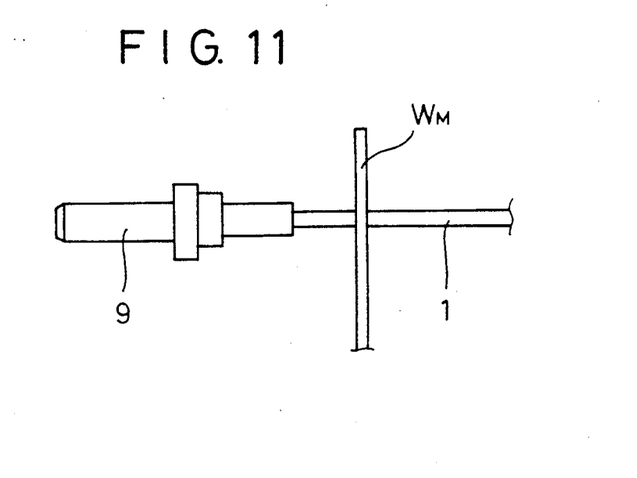
FIG. 11 is a front view showing a state in which a shape memory alloy wire to be formed into the urging spring is disposed beside that portion of the nylon-coated fiber near the ferrule of FIG. 9.

In fitting the urging spring 19 on the nylon-coated fiber 1, the shape memory alloy wire $W_M$ having a straight shape is located beside the fiber 1 and heat-treated. By doing this, the wire $W_M$ is transformed into the previously stored spring shape, and is fitted on the fiber 1.

Alternatively, the shape memory alloy wire, stored with the shape of the urging spring 19, may be previously shaped like a coil having a diameter greater than that of the ferrule 9 so that it can be fitted on the nylon-coated fiber 1 from the outside. In this case, the coiled shape memory wire is transformed into the urging spring 19 having a previously stored predetermined diameter by being heat-treated.

Figure 12:
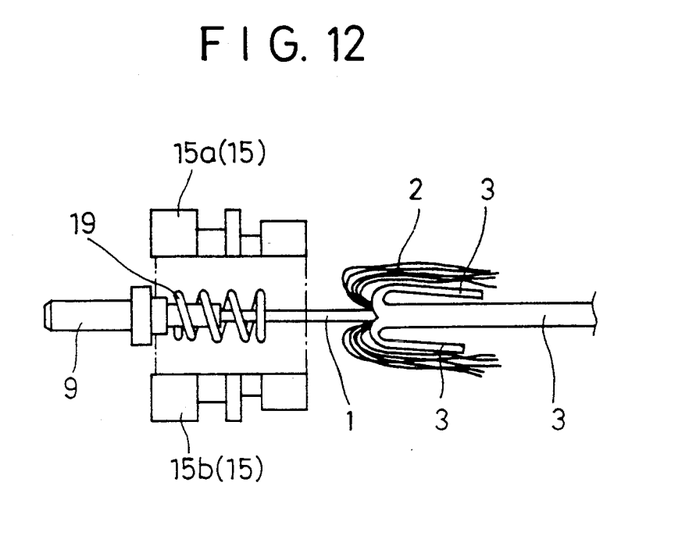
FIG. 12 is a front view showing the way of mounting a holder.

In a third process, the holder 15 formed of the pair of half pieces 15a and 15b is mounted on the rear portion of the ferrule 9 so that the urging spring 19 is interposed between them, as shown in FIG. 12. The holder 15 is halved with respect to its axial direction so that it can be fitted from the outside.

In mounting the half pieces 15a and 15b, the distal end of the sheath 3 is cut into two branches, and the tension member 2 and the sheath 3 are bent rearward lest they be caught in the holder 15, as shown in FIG. 12. In this state, the pieces 15a and 15b are mounted from the outside, and are fixedly bonded to each other by means of an adhesive agent.

Figure 13:
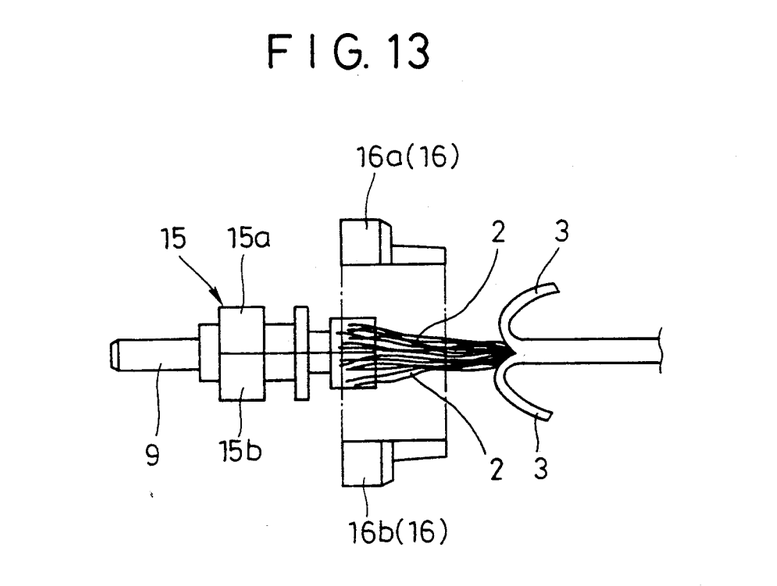
FIG. 13 is a front view showing the way of mounting a gripper.

Then, in a fourth process, the gripper 16 is mounted on the rear portion of the holder 15, as shown in FIG. 13. The gripper 16, like the holder 15, is formed of the half pieces 16a and 16b which are divided from each other with respect to the axial direction, as shown in FIG. 13.

In mounting the gripper 16, the tension member 2 is moved forward along the holder 15, and the half pieces 16a and 16b are fixed by means of an adhesive agent in a manner such that the member 2 is held between the two members 15 and 16.

Figure 14:
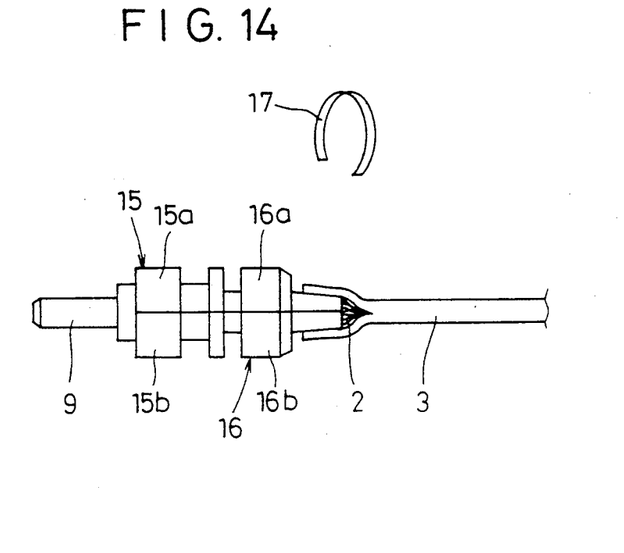
FIG. 14 is a front view showing the way of mounting a C-ring.

In a fifth process, the C-ring 17 is attached to the rear portion of the gripper 16, as shown in FIG. 14. In doing this, the rearwardly bent distal end portion of the sheath 3 is moved toward the gripper 16, as shown in FIG. 14, and the C-ring 17 is fitted on the distal end portion. Then, the C-ring 17 is inwardly pressed to be gripped. Thus, the distal end of the sheath 3 is held between the members 16 and 17.

Figure 15:
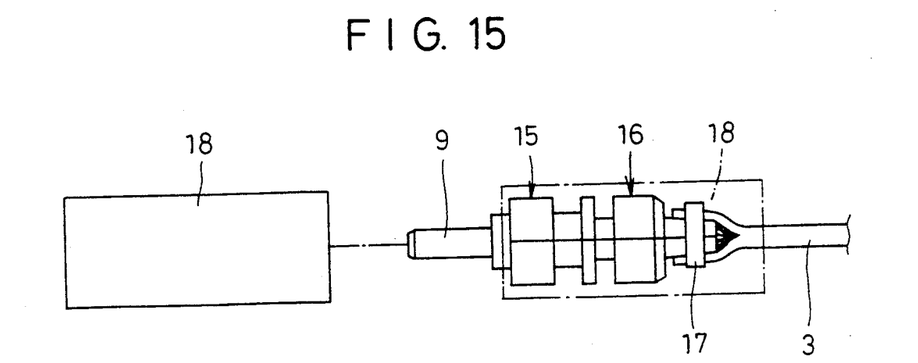
FIG. 15 is a front view showing the way of mounting a heat-shrinkable tube.

Then, in a sixth process, the heat-shrinkable tube 18 is fitted on to the resulting structure from the side of the ferrule 9, and is heat-treated to cover the rear side of the ferrule 9. The tube 18 is used in placed of the rubber boot of the first embodiment.

In the assembling method according to this second embodiment, the optical connector is assembled following the various processes described above. In this case, each of the holder 15 and the gripper 16 is a split body such that it can be mounted by after-attachment. It is unnecessary, therefore, to fit these members on the optical fiber cable beforehand and to move them toward the ferrule 9 with every process. Thus, the optical connector can be assembled very easily. According to this method, moreover, the optical connector can be assembled in an automatic assembly line, whereby the productivity can be further improved.

What is claimed is:

1. An optical connector comprising:
   an optical fiber cable including a nylon-coated fiber, a tension member thereon, and a sheath covering the nylon-coated fiber and the tension member, the optical fiber cable having a distal end;
   a ferrule provided at the distal end of the optical fiber cable so as to be attached to the distal end of the nylon-coated fiber; and
   a holder having a distal end which is restricted in position along the optical fiber cable by the ferrule when the holder is mounted on the nylon-coated fiber,
   said holder being mounted on the nylon-coated fiber by after-attachment, and wherein said holder includes means for enabling said after-attachment thereof to said nylon-coated fiber.

2. An optical connector according to claim 1, wherein said holder has a slit therein for enabling said after-attachment, said slit extending substantially parallel to the axis of the nylon-coated fiber.

3. An optical connector according to claim 1, which further comprises a gripper attached to a rear portion of said holder, said holder and said gripper being each formed of a split body mounted on the nylon-coated fiber by after-attachment.

4. An optical connector according to claim 3, which further comprises an urging spring mounted on said nylon-coated fiber and interposed between the ferrule and the holder and being arranged to urge the ferrule forward toward said distal end of the optical fiber cable, said urging spring being formed of a shape memory alloy wire and being mounted on the nylon-coated fiber by after-attachment.

5. In a method for assembling an optical connector which comprises an optical fiber cable including a nylon-coated fiber, a tension member thereon, and a sheath covering the nylon-coated fiber and the tension member, the optical fiber cable having a distal end; a ferrule provided at the distal end of the optical fiber cable so as to be attached to the distal end of the nylon-coated fiber; a holder having a distal end which is restricted in position along the optical fiber cable by the ferrule when the holder is mounted on the nylon-coated fiber; an urging spring mounted on the nylon-coated fiber so as to be interposed between the ferrule and the holder and being arranged to urge the ferrule forward; and a gripper attached to a rear portion of the holder, the assembling method comprising:
   forming said holder of a split body;
   mounting said holder on the nylon-coated fiber by after-attachment after the ferrule is mounted on the distal end of the fiber; and
   thereafter mounting said spring on a rear portion of said ferrule.

6. A method for assembling an optical connector according to claim 5, wherein said gripper is formed of a split body, and comprising mounting said gripper on the rear portion of said holder by after-attachment, whereby a distal end of said tension member is held between said gripper and said holder.

* * * * *